J. C. CAVITT.
ELECTRIC HEATING APPARATUS.
APPLICATION FILED APR. 27, 1921.
1,424,340.
Patented Aug. 1, 1922.
3 SHEETS—SHEET 1.
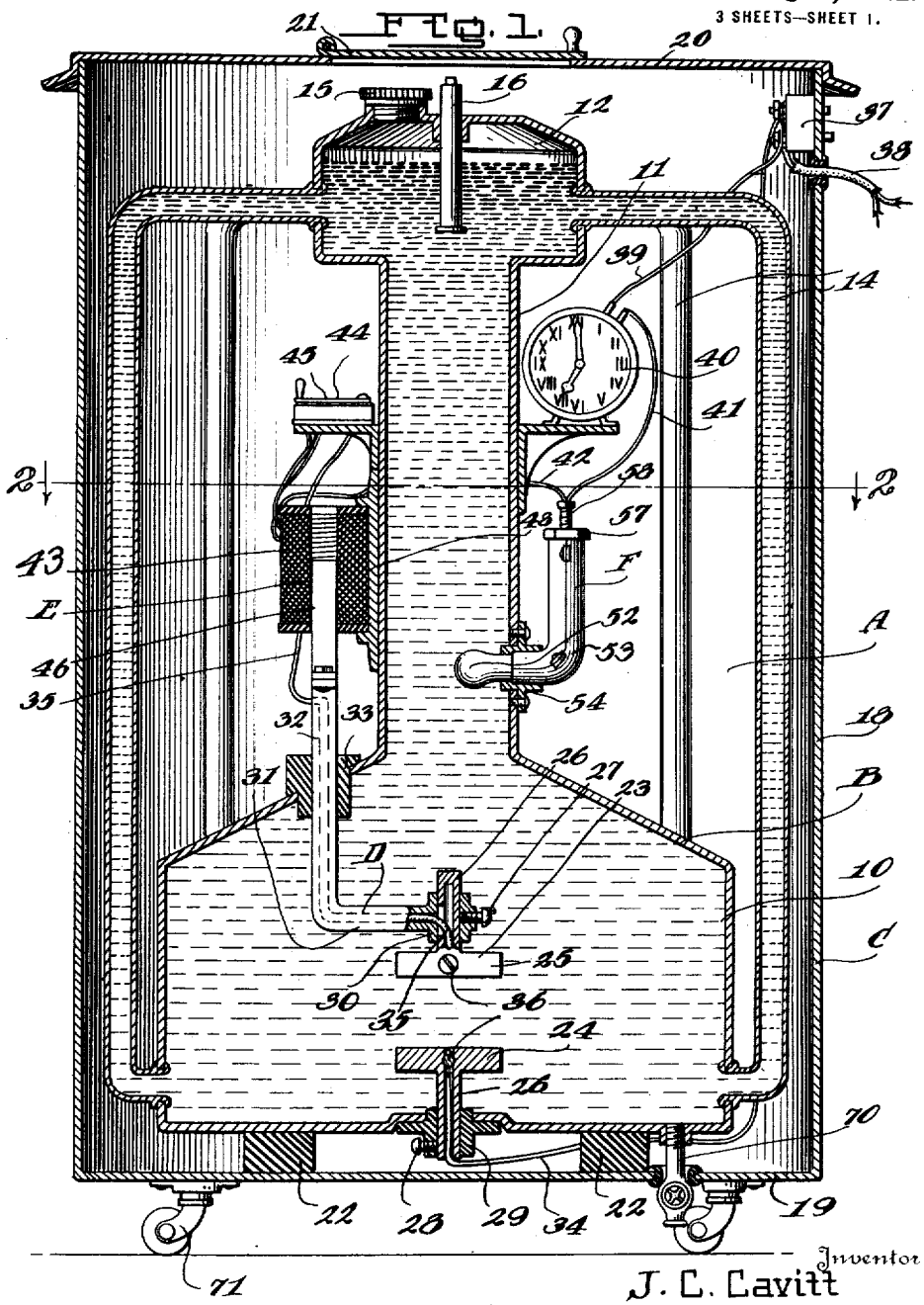
Inventor
J. C. Cavitt
By Lancaster and Allwine
Attorneys J. C. CAVITT.
ELECTRIC HEATING APPARATUS.
APPLICATION FILED APR. 27, 1921.
1,424,340.
Patented Aug. 1, 1922.
3 SHEETS—SHEET 2.
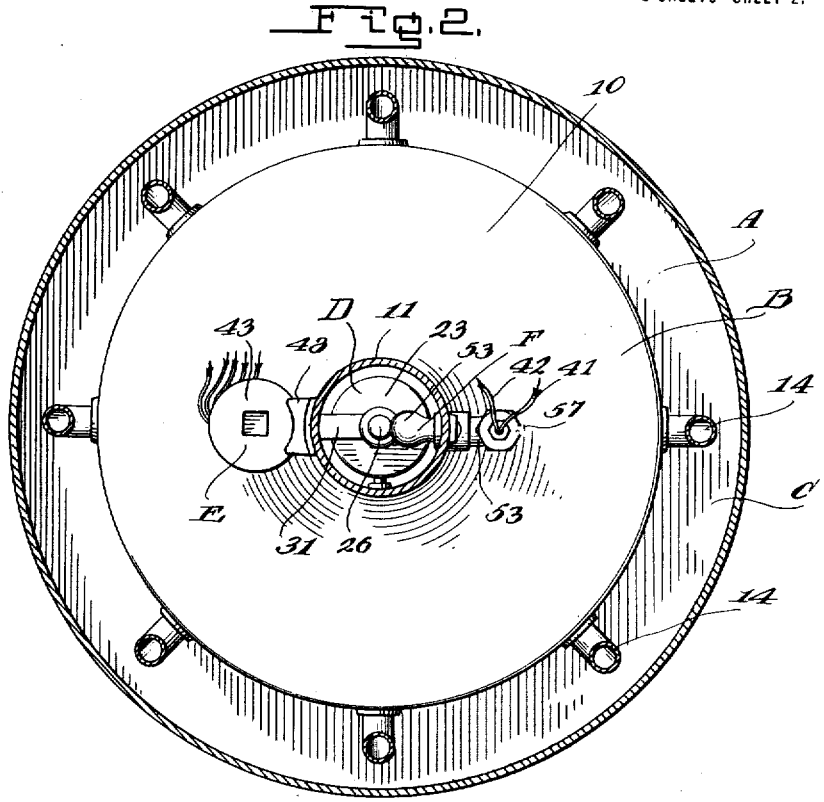
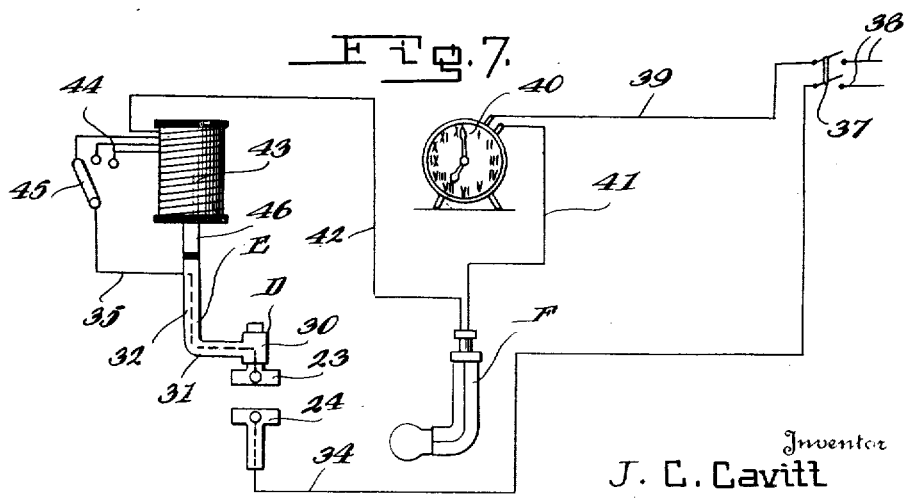
Inventor
J. C. Cavitt J. C. CAVITT.
ELECTRIC HEATING APPARATUS.
APPLICATION FILED APR. 27, 1921.
1,424,340.
Patented Aug. 1, 1922.
3 SHEETS—SHEET 3.
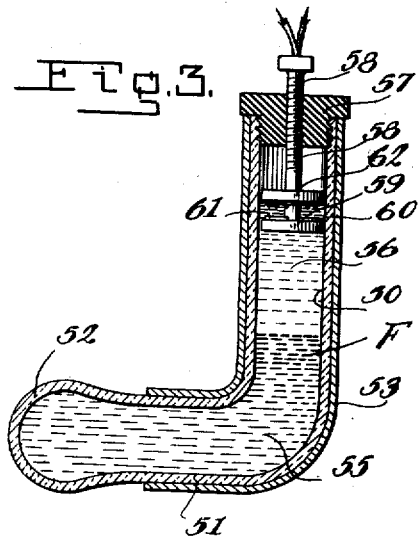
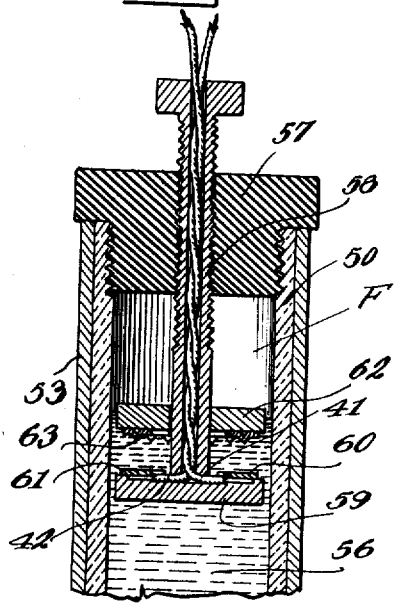
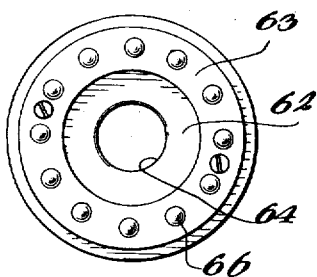
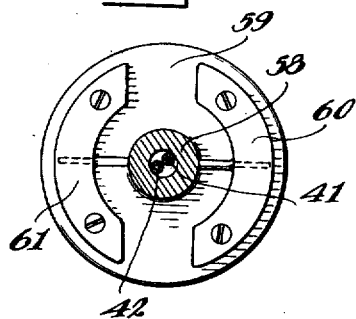
J. C. Cavitt
Inventor

UNITED STATES PATENT OFFICE.

JOHN C. CAVITT, OF WEIRTON, WEST VIRGINIA.

ELECTRIC HEATING APPARATUS.

1,424,340. Specification of Letters Patent. Patented Aug. 1, 1922.

Application filed April 27, 1921. Serial No. 464,969.

*To all whom it may concern:*

Be it known that I, JOHN C. CAVITT, a citizen of the United States, residing at Weirton, in the county of Hancock and State of West Virginia, have invented certain new and useful Improvements in Electric Heating Apparatus, of which the following is a specification.

This invention relates to electric fluid heaters of the type in which the fluid is heated by passing the current directly through the same, and the objects of the invention are to provide first, a heater of this type, having a number of safety features, which can be used for numerous purposes, such as for heating water for household purposes, for generating steam for heating systems, or for scientific research work, second to provide means for automatically regulating the amount of current flowing through the liquid, third to provide automatic means for cutting out the heater when the temperature of the liquid reaches a predetermined degree, and fourth to provide means for permitting the automatic starting and stopping of the heater when so desired.

Other objects of the invention are to provide a novel form of container for the liquid so that the liquid will be readily heated, and to provide a novel means for mounting the electrodes within the liquid to permit the ready flow of current therethrough.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a vertical section through the improved heater.

Figure 2 is a horizontal section through the same, taken on the line 2—2 of Figure 1.

Figure 3 is an enlarged fragmentary section through the automatic means for cutting out the heater when the temperature of the water reaches a predetermined degree.

Figure 4 is an enlarged fragmentary section through the upper end of the same illustrating the type of circuit maker and breaker utilized.

Figure 5 is a bottom plan view of the float carrying the bridge piece of the circuit maker and breaker.

Figure 6 is a top plan view of the stationary section carrying the pair of spaced contact points adapted to be bridged by the bridge piece carried by the float, the stem of the member being shown in section.

Figure 7 is a diagrammatic view of the wiring circuit for the heater.

Referring to the drawings in detail, wherein similar reference characters designate corresponding parts throughout the several views, the letter A indicates the improved heater, which includes the liquid container B; the protecting casing C therefor; the liquid heating device proper D; the automatic means E for regulating the amount of current flowing through the liquid; and F, the automatic means for cutting out the heater when the liquid reaches a predetermined temperature.

The liquid container B includes a body portion 10, a stem portion 11, and a head 12. The body portion 10, the stem 11 and the head 12 may be of any preferred construction or configuration, and in the body portion 10 is positioned the main body of water to be heated, and the heater proper D is positioned therein. As the water is heated in the body portion 10, the same arises through the stem 11 into the head 12, where the same is returned to the lower portion of the body 10 by means of a plurality of return pipes 14, which are positioned at spaced points around the container. The head 12 may be provided with a filler cap 15, so as to permit the same to be readily filled with water, and if so desired, the same may carry a suitable gauge or escape valve 16, so that the amount of water in the container can be readily determined.

The protecting casing C is adapted to completely house the water container B and its associate parts, and the casing C may be made of any desired material or of any desired shape or configuration, so as to present a pleasing appearance to the eye. As shown the protecting casing C is of a cylindrical form, and includes the side wall 18, the bottom wall 19, and the top wall 20. The top wall 20 may be provided with a hinged cover 21, in order to permit the ready filling of the container B, and if so desired, the whole top wall 20 may be made removable in order to permit access to be had to the whole interior of the casing. The liquid container B can be spaced from the lower wall 19 by means of suitable insulating blocks 22.

The electric heating means proper D includes an upper electrode 23 and a lower electrode 24. Each of these electrodes are of substantially the same construction and include flat superposed bases 25 and hollow stems 26. These electrodes can be initially adjusted in relation to each other and held in their adjusted positions by means of set screws 27 and 28 which are adapted to frictionally engage the stems. As shown the set screw 28 is carried by a suitable insulating bushing 29, which is carried by the bottom wall of the body portion 10 of the liquid container. It can be seen that the stem of the lower electrode passes through the bushing, and that the electrode can be moved toward or away from the central part of the body portion 10. The set screw 27 is carried by a sleeve 20 and is adapted to frictionally engage the stem 26 of the upper electrode 23. The sleeve 30 is carried by the lower hollow arm 31 of a hollow post 32, which is slidably mounted in a suitable insulated bushing 33, which is carried by the upper wall of the body portion 10 of the water container B. This bushing 33 is so formed as to absolutely preclude the escaping of liquid from around the same.

The hollow stem of the lower electrode has arranged therein one end of an electric wire 34, while the hollow stem of the upper electrode 23 has arranged therein one end of the electric wire 35. This electric wire 35 also passes through the hollow angle end 31 of the post 32 and through the post 32. The ends of the wires 34 and 35 may be held in place in the electrodes by means of set screws or the like 36.

The wire 34 leads to one terminal of a suitable hand operated switch 37, which may be of any preferred character. As shown this hand operated switch is of the push button type and is secured in any preferred manner to the side wall 18 of the protecting casing C. This switch 37 has also connected thereto the line wires 38 of a suitable electric supply circuit. The opposite terminal of the switch has secured thereto a wire 39. The wire 39 leads to one terminal of a suitable contact making clock of any preferred type, which is arranged to shut current off or turn it on at stated periods of time. The other terminal of this contact making clock which is designated by the numeral 40 has the electric wire 41 secured thereto which leads to one contact of the automatic circuit maker and breaker F, which will be hereinafter more fully described. The other contact of the circuit maker and breaker has connected thereto a wire 42, which leads to one terminal of a suitable solenoid 43, which forms a part of the automatic current regulator E which will now be described. The windings of the solenoid 43 have connected thereto at different points the different plugs of a rheostat 44, the lever 45 of which has electrically connected thereto the wire 35. It can be seen that by moving the lever 45 over plugs 44, the amount of current passing through the solenoid 43 will be regulated. The upper end of the post 32 has secured thereto in any preferred manner the core 46 of the solenoid 43, and this regulator device E operates as follows: When it is desired to allow a certain amount of current to pass between the electrodes 23 and 24, the rheostat lever 45 is moved into engagement with the plug which represents this amount of current. The solenoid 43 will then become energized and raise the core 46 to a predetermined height which will space the electrodes 23 and 24 a predetermined distance. The electrodes will hold this position as long as the current remains at this amperage, but if the current rises beyond this amperage, the current in the solenoid will be increased, which will raise the core 46 further into the solenoid and thus space the electrodes 23 and 24 a further distance apart. If the current should fall below the desired amperage for any reason, the electrodes will be moved closer to each other. By this construction, it can be seen that the current passing through the liquid in the container can be held in any desired amperage. In order to prevent the turning of the post 32, it is desired that the core 46 be polygonal shaped in cross section, and the inside surface of the core shaped to conform to this configuration. The solenoid 43 can be held by means of a suitable bracket 48 to the stem 11 of the liquid container B.

The automatic means F for cutting out the heater D when the liquid reaches a predetermined temperature includes a glass tube 50 having an angular end 51, which is adapted to be inserted within the stem 11 of the liquid container B. If so desired the terminal of the angular end 51 may be enlarged to a spherical shape, as shown at 52. A suitable protecting metallic housing 53 may be provided for the tube if so desired, leaving only the spherical end 52 thereof exposed. The same is held in position by means of a liquid tight collar or the like 54. The tube is adapted to receive a predetermined quantity of mercury 55 and on top of the mercury is placed a quantity of oil 56 of high insulating qualities and high flash test. A suitable insulating cap 57 is threaded into the upper end of the tube and supports a hollow threaded stem 58 which can be raised or lowered by turning the stem 58 in the cap. The lower end of the hollow stem 58 has secured thereto an insulating plate 59, and the upper surface of this plate has secured thereto the spaced contact plates 60 and 61, to which are secured respectively the wires 41 and 42. A float 62 is arranged on the upper surface of the oil 56 and carries a suitable ring 63 formed of electricity conducting material, and this ring forms a bridge piece for the contacts 60 and 61. The float 62 is provided with a central bore 64, through which the stem 68 protrudes and the stem forms a guide for the float. It can be seen that the wires 41 and 42 extend through the stem 58.

If so desired the ring 63 may be provided with a plurality of struck-out tits 66, in order to insure the contacting of the bridge ring 63 with the contacts 60 and 61.

The operation of this automatic cut out is as follows:

When the water reaches a predetermined temperature, the mercury 55 will expand, thus raising the oil 56 which will carry the float 62 away from the stationary plate 59 and consequently breaking the circuit between the contacts 60 and 61. It can be seen that by raising or lowering the plate 59, the point at which the circuit can be broken can be regulated.

The operation of the improved electric heater is as follows: Water or other liquid is introduced in the container B through the filling cap 15 and the rheostat 44 is adjusted to the desired amperage, and the switch 37 is actuated in order to permit the current to flow through the wires 39 and 34. The current will flow through, say the wire 39, through the automatic cut out F, through the wire 42, the solenoid 43, the wire 35, to the electrode 23, through the liquid, through the electrode 24, through the wire 34 and back out through the switch 37. The passage of the current through the electrodes and the liquid will raise the temperature of the liquid and the same will rise through the stem 11 into the head 12 and will then return back to the body portion 10 through the return pipes 14.

While an electric time clock 40 has been shown in the circuit, it is to be understood that the same can be eliminated if so desired.

A suitable drain cock 70 communicates with the body portion 10 and permits the liquid to be drawn from the container B when so desired.

If desirable the protecting casing C may be mounted on the suitable casters 71.

From the foregoing description, it can be seen that an electric liquid heater has been provided of simple construction, which will permit the ready heating of water and which embodies a number of safety features for controlling the flow of current through the liquid and for cutting off the heater when the temperature of the water reaches a predetermined degree.

Changes in details may be made without departing from the spirit or scope of this invention but,

I claim:

1. An electric heater for liquids comprising a liquid container, an electric circuit, a pair of electrodes interposed in the circuit and arranged in the liquid in the container, and means for initially adjusting the position of the electrodes in relation to each other.

2. An electric heater for liquids comprising a liquid container, an electric circuit, a pair of electrodes in the circuit and arranged in the liquid in the container, and a solenoid interposed in the circuit for actuating one of the electrodes so that the electrode will be brought nearer to or further from the other electrode according to the amount of current passing through the solenoid.

3. An electric heater for liquids comprising a liquid container, an electric circuit, a pair of electrodes interposed in the circuit and arranged in the liquid in the container, means for initially adjusting the position of the electrodes in relation to each other, a sliding carrier for one of the electrodes, a solenoid interposed in the circuit and arranged to receive the carrier, whereby the electrode may be brought nearer to or further from the other electrode according to the amount of current passing through the solenoid.

4. An electric heater for liquids comprising a liquid container, an electric circuit, a pair of electrodes interposed in the circuit and arranged in the liquid in the container, a solenoid interposed in the circuit, a core for the solenoid, a carrier for one of the electrodes slidably carried by the container and secured to the core so that the electrode will be moved nearer to or further from the other electrode, according to the amount of current passing through the solenoid, a manually operated rheostat interposed in the circuit and connected to the solenoid, and means for introducing liquid into the container.

5. An electric heater for liquids comprising a liquid container, an electric circuit, a pair of spaced electrodes interposed in the circuit and arranged in the liquid in the container, a circuit maker and breaker interposed in the circuit for opening the circuit when the liquid in the container reaches a predetermined temperature, and means controlling the amount of current passing through the electrodes.

6. In an electric liquid heater, a liquid container, an electric circuit, a pair of spaced electrodes interposed in the circuit and arranged in the liquid to be heated, a circuit maker and breaker interposed in the circuit for opening the circuit when the temperature of the liquid reaches a predetermined degree, the circuit maker and breaker including an angular tube, an expansible medium arranged in the tube, one end of the tube being disposed in the liquid in the container, insulating oil in the tube and disposed upon the expansible medium, an immovable plate, a float, a pair of contacts carried by the plate, and a bridge member carried by the float.

7. In an electric heater for liquids, a liquid container, a circuit, a pair of electrodes interposed in the circuit and arranged in the liquid in the container, a circuit maker and breaker disposed in the circuit and arranged to open the circuit when the liquid reaches a predetermined temperature, said circuit maker and breaker including an angular glass tube having one end thereof disposed in the liquid, a quantity of expansible material arranged in the tube, insulating oil arranged on the upper surface of the expansible medium, a stationary plate arranged in the insulating oil, a pair of contacts carried by the plate, a float arranged on the upper surface of the oil, a bridge piece carried by the float, and means for adjusting the position of the plate in relation to the oil and expansible medium.

8. In an electric heater for liquids, a liquid container, a circuit, a pair of electrodes interposed in the circuit and arranged in the liquid in the container, a circuit maker and breaker disposed in the circuit and arranged to open the circuit when the liquid reaches a predetermined temperature, said circuit maker and breaker including an angular glass tube having one end thereof disposed in the liquid, a quantity of expansible material arranged in the tube, insulating oil arranged on the upper surface of the expansible medium, a stationary plate arranged in the insulating oil, a pair of contacts carried by the plate, a float arranged on the upper surface of the oil, a bridge piece carried by the float, and means for adjusting the position of the plate in relation to the oil and expansible medium, and an electric time contact making and breaking clock interposed in the circuit.

9. An electric fluid heater comprising a water container including a body portion, a narrow stem, a head carried by the stem, and return pipes connecting the head with the lower portion of the body, an electric circuit, a pair of electrodes interposed in the circuit and arranged in the body portion of the container, and a protecting housing for the water container.

10. An electric heater for liquids comprising a liquid container including a body portion, a stem, a head, and return pipes connecting the head with the lower portion of the body and arranged in the container at spaced points, an electric circuit, a pair of electrodes interposed in the circuit and disposed in the liquid in the body portion of the container, means for initially adjusting the position of the electrodes toward each other, and means for automatically regulating the position of the electrodes in relation to each other in accordance with the amount of current passing through the circuit.

11. In an electric fluid heater, a water container, a circuit, a pair of electrodes interposed in the circuit disposed in the water container, each of the electrodes including a flat body portion and a hollow stem, the wires forming a part of the circuit being threaded through the hollow stems and secured to the body portions of the electrodes, and means for adjustably receiving said stems.

12. In an electric liquid heater, a contact maker and breaker including a glass tube having an angular spherical end, an expansible medium arranged in the tube, an insulating oil arranged in the tube and positioned on top of the expansible medium, a head carried by the tube, a plate immersed in said oil, a stem carried by the plate, and adjustably connected to the head, whereby the position of the plate in relation to the oil and expansible medium can be varied, and pair of contacts carried by the upper surface of the plate, an annular float arranged on the upper surface of the oil, and an annular bridge piece carried by the float and arranged to engage the contacts at certain periods.

JOHN C. CAVITT.